(No Model.)
A. A. BEVIN & J. C. WELLS.
LANTERN BRACKET FOR BICYCLES.
No. 568,328. Patented Sept. 29, 1896.
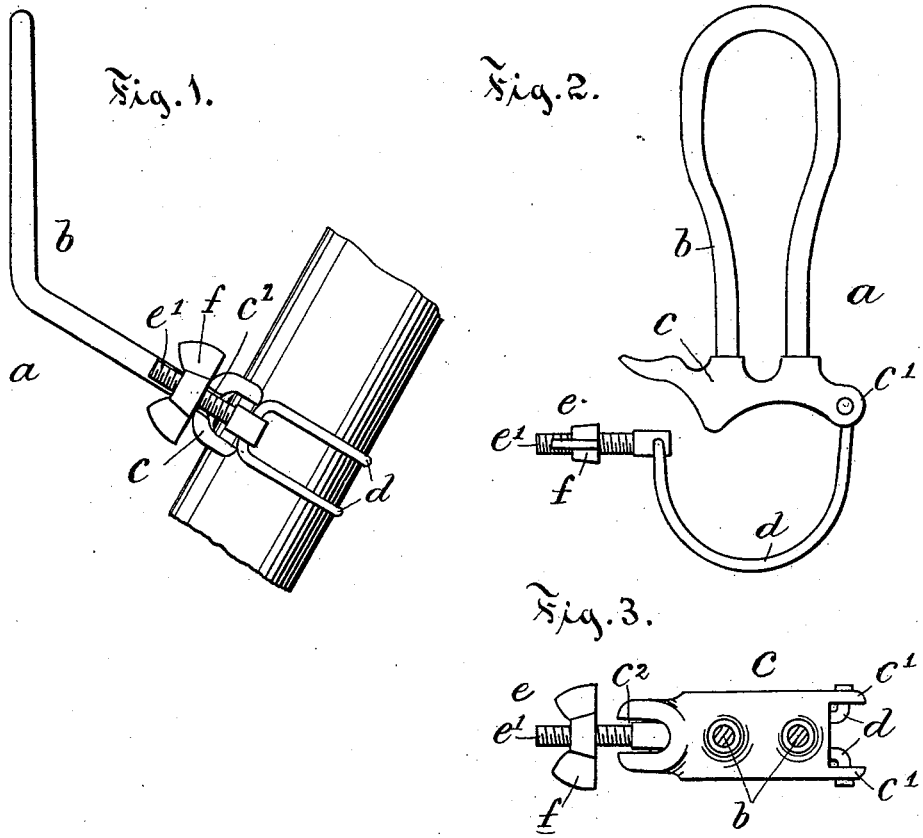
Witnesses:
J. A. Cantin
A. B. Jenkins
Inventors:
Abner A. Bevin
John C. Wells
by Chas. L. Burdett,
attorney
THE NORRIS PETERS CO., PHOTO-LITHO., WASHINGTON, D. C.

UNITED STATES PATENT OFFICE.

ABNER AVERY BEVIN AND JOHN C. WELLS, OF EAST HAMPTON, CONNECTICUT.

LANTERN-BRACKET FOR BICYCLES.

SPECIFICATION forming part of Letters Patent No. 568,328, dated September 29, 1896.

Application filed July 5, 1894. Serial No. 516,551. (No model.)

*To all whom it may concern:*

Be it known that we, ABNER AVERY BEVIN and JOHN C. WELLS, citizens of the United States, and residents of East Hampton, in the county of Middlesex and State of Connecticut, have invented certain new and useful Improvements in Lantern-Brackets for Bicycles, of which the following is a full, clear, and exact description, whereby any one skilled in the art can make and use the same.

The object of our invention is to provide a lamp-bracket that is easily attached to or detached from a bicycle or like vehicle, the bracket comprising an adjustable clamp for securely attaching the device to the frame of a bicycle.

To this end our invention consists in the details of the several parts making up the bracket and its clamp, as more particularly hereinafter described, and pointed out in the claim.

Referring to the drawings, Figure 1 is a detail view, in side elevation, of the lamp-bracket as secured to the steering-head of a bicycle. Fig. 2 is a detail plan view of the bracket removed and with the clamp unfastened. Fig. 3 is a detail view of the clamp-base, showing the catch thrown one side.

In the accompanying drawings the letter $a$ denotes the bracket as a whole; $b$, the lamp-arm; $c$, the clamp-base; $d$, the clamp, and $e$ the lock.

In the form of device shown in Figs. 1, 2, and 3 of the drawings the lamp-arm is made of wire bent to shape and secured in sockets in the clamp-base. The flexible clamp $d$ is also made of wire in form of a loop, the opposite ends of the wire forming the loop being turned upward, passed through the ears $c'$ in the clamp-base, and held in place by heading over the end, thus forming a pivotal connection of the loop to the clamp-base. To the outer end of the loop is pivotally attached the lock $e$, which consists of a screw-bolt $e'$, on which is a nut $f$, which is larger in diameter than the socket $c^2$ in the clamp-base into which the screw-bolt is adapted to be swung.

The bracket, as a whole, is secured to the steering-head $g$ of a bicycle by encircling the tubular head with the clamp, swinging the bolt into position, as shown in Fig. 1 of the drawings, and then turning down the nut, clamping the bracket firmly in place.

A lamp-bracket having the lamp-arm of wire, but adapted to be secured to a fork side, is provided by simply twisting the arm, so that it will be held in the proper position when attached to the side.

The clamp-base has the forked bolt-socket in all forms of the device, as it more readily adapts the structure for being quickly and conveniently attached to or removed from the frame of a bicycle.

We claim as our invention—

In combination in a lamp-bracket for a bicycle, a clamp-base having a reëntrant surface on one side, a flexible wire clamp pivoted to fixed pivots in ears on the clamp-base, a forked open bolt-socket located in the opposite end of the clamp-base from the pivots, a lamp-arm made of wire bent to shape and secured to the clamp-base, a screw-bolt pivoted in the loop at the free end of the clamp, and a fastening-nut borne on the bolt and adapted to engage the forked end of the clamp-base, all substantially as described.

ABNER AVERY BEVIN.
JOHN C. WELLS.

Witnesses:
LYMAN B. HIGGINS,
TITUS S. MARKHAM.